US011166468B2

(12) United States Patent
Ramm et al.

(10) Patent No.: US 11,166,468 B2
(45) Date of Patent: Nov. 9, 2021

(54) DEVICE FOR THE HEAT TREATMENT OF FOOD PRODUCTS COMPRISING A CHARGING TROLLEY

(71) Applicant: Wiesheu GmbH, Grossbottwar (DE)

(72) Inventors: Alexander Ramm, Markgroeningen (DE); Falko Droege, Oppenweiler (DE)

(73) Assignee: WIESHEU GMBH, Grossbottwar (DE)

( * ) Notice: Subject to any disclaimer, the term of this patent is extended or adjusted under 35 U.S.C. 154(b) by 354 days.

(21) Appl. No.: 16/176,654

(22) Filed: Oct. 31, 2018

(65) Prior Publication Data

US 2019/0059394 A1    Feb. 28, 2019

Related U.S. Application Data

(63) Continuation of application No. PCT/EP2017/060763, filed on May 5, 2017.

(30) Foreign Application Priority Data

May 9, 2016 (DE) ...................... 20 2016 102 463.3

(51) Int. Cl.
  *A21B 3/07*  (2006.01)
(52) U.S. Cl.
  CPC ..................................... *A21B 3/07* (2013.01)
(58) Field of Classification Search
  CPC ....................................................... A21B 3/07
  See application file for complete search history.

(56) References Cited

U.S. PATENT DOCUMENTS 2,545,696 A * 3/1951 Harvuot .................... F27B 9/38
                                                                414/401
3,261,484 A    7/1966 Ingemar
              (Continued)

FOREIGN PATENT DOCUMENTS

DE            19903048 A1   8/2000
DE         102015104517 B3   9/2016
              (Continued)

OTHER PUBLICATIONS

Japanese Office Action dated Dec. 3, 2019 from counterpart Japanese Patent Application No. JP 2018-559976.
(Continued)

*Primary Examiner* — Nathaniel Herzfeld
(74) *Attorney, Agent, or Firm* — Shuttleworth & Ingersoll, PLC; Jason R. Sytsma

(57) ABSTRACT

A device for the heat treatment of food products is disclosed, including a heat treatment device having at least one oven unit with a cooking chamber being configured for receiving product carriers with food products, and including t least one charging trolley for receiving at least one charging rack for a plurality of product carriers which can be coupled to the heat treatment device to move the at least one charging rack with product carriers back and forth between the at least one oven unit and the charging trolley, wherein catches are provided on the heat treatment device, to which receiving means are assigned on each charging trolley, and a drive is provided for vertical movement of the catches to the receiving means on the charging trolley from the entry position of the charging trolley via vertical lifting, and to align the charging trolley with the catches by means of further lifting, until same reaches a defined end position in the working position.

20 Claims, 3 Drawing Sheets

(56) References Cited

U.S. PATENT DOCUMENTS

| | | | | |
|---|---|---|---|---|
| 3,439,665 | A | * | 4/1969 | Borje ................. A21B 1/26 126/21 A |
| 3,869,052 | A | * | 3/1975 | Leahy ................. A21B 3/07 414/401 |
| 4,634,333 | A | * | 1/1987 | Butterly, Jr. ........... B65G 65/00 187/251 |
| 5,224,812 | A | * | 7/1993 | Oslin ................. A21B 3/07 414/401 |
| 5,387,063 | A | * | 2/1995 | Napierkowski ........... B62B 5/04 104/251 |
| 5,655,595 | A | * | 8/1997 | Westbrooks, Jr. ..... A47J 39/006 165/48.1 |
| 6,089,812 | A | * | 7/2000 | Junker ................ B23Q 7/1436 414/396 |
| 7,798,502 | B2 | * | 9/2010 | Sukey ................. B62B 3/10 280/47.35 |
| 7,871,234 | B2 | * | 1/2011 | Yuyama ............... A61G 12/001 414/498 |
| 2009/0226287 | A1 | * | 9/2009 | Keller ................. B65H 19/126 414/226.04 |
| 2014/0083308 | A1 | | 3/2014 | Galjaard et al. |

FOREIGN PATENT DOCUMENTS

| | | |
|---|---|---|
| EP | 1908350 A1 | 4/2008 |
| FR | 1458682 A | 3/1966 |
| FR | 2566998 A1 | 1/1986 |
| FR | 2682855 A1 | 4/1993 |
| JP | H05132268 A | 5/1993 |
| JP | 2012197151 A | 10/2012 |
| JP | 2014518623 A | 8/2014 |
| NL | 100559 C | 9/1961 |
| WO | WO2013124235 A2 | 8/2013 |

OTHER PUBLICATIONS

International Search Report and Written Opinion dated Aug. 1, 2017 for counterpart PCT Application No. PCT/EP2017/060763.

* cited by examiner

DEVICE FOR THE HEAT TREATMENT OF FOOD PRODUCTS COMPRISING A CHARGING TROLLEY

CROSS-REFERENCES TO RELATED APPLICATIONS

This application is a continuation of international patent application PCT/EP2017/060763, filed on May 5, 2017 designating the U.S., which international patent application has been published in German language and claims priority from German patent application 202016102463.3, filed on May 9, 2016. The entire contents of these priority applications are incorporated herein by reference.

BACKGROUND OF THE INVENTION

The invention relates to a device for the heat treatment of food products comprising a heat treatment device having at least one oven unit including a cooking chamber being designed for receiving product carriers with food products, and comprising at least one charging trolley for receiving at least one charging rack for a plurality of product carriers which can be coupled with the heat treatment device to move the at least one charging rack with product carriers between the at least one oven unit and the charging trolley back and forth, and further comprising means for moving the at least one charging rack between the at least one oven unit and the charging trolley, when the charging trolley is coupled to the heat treatment device and is within a working position, and further comprising a coupling device that allows to engage the charging trolley and to move it between a charging position and a working position.

Such a device is known from WO 2013/124235 A2.

Using the known device a plurality of product carriers can be driven into the respective oven units and removed therefrom in a simple way.

Although in this device basically also a coupling device is disclosed that shall ensure the positioning of the charging trolley at the oven within a working position, it is not disclosed, however, how such a coupling device shall be designed in practice. To this end merely a stop can be seen within the drawing.

Thus in operation the charging trolley must be coupled with such a device to the baking units by hand and must finally be adjusted so precisely that subsequently a transfer of the at least one charging rack between the charging trolley and the respective oven unit is possible. This operation may be very time-consuming. Uneven floors and height variations at the charging trolley in addition may lead to the consequence that a transfer between the charging rack and between the charging trolley and the respective oven unit is not possible at all without a prior further adjustment, or is at least impeded considerably.

From German patent application 10 2015 104 517.6 which, however is not pre-published, it is basically known to provide catches at the heat treatment device, to which receiving means are provided at the charging trolley, wherein a drive for the vertical movement of the catches is provided for coupling the catches from a charging position of the charging trolley by vertical lifting by means of the supports to the charging trolley and to adjust the charging trolley during further lifting using the catches, until the latter reaches a defined final position within the working position.

However in practice to this end a portal at the front size of the heat treatment device is necessary whereon the catches are provided to which the supports are assigned at the charging trolley.

By this pre-arranged portal the constructed space is considerably enlarged which is seen detrimental.

SUMMARY OF THE INVENTION

In view of this it is one aspect of the invention to disclose a device for the heat treatment of food products that allows for a precise positioning of a charging trolley within a defined working position without any manual interaction.

It is another aspect of the invention to disclose a device for the heat treatment of food products that allows for a simple and reliable way of loading and unloading of a charging trolley so that a charging rack can be moved back an forth between the charging trolley and the heat treatment device.

It is another aspect of the invention to disclose a device for the heat treatment of food products that allows for a precise positioning of a charging trolley within a defined working position while keeping the needed constructive space as small as possible.

According to a first aspect there is disclosed a device for the heat treatment of food products, comprising:

a heat treatment device having at least one baking unit including a cooking chamber being configured for receiving product carriers with food products;

a charging trolley being configured for receiving at least one charging rack for a plurality of product carriers;

a positioning device arranged at said heat treatment device and being configured for engaging said charging trolley when said charging trolley is moved against said positioning device into a charging position and for moving said charging trolley between said charging position and a working position, wherein each charging rack is aligned with an assigned cooking chamber;

a plurality of catches provided on said positioning device;

a plurality of receptacles provided on said charging trolley and being configured for engaging said catches when moving said charging trolley against said positioning device; and wherein said positioning device is further configured for moving said catches vertically from said charging position for aligning said charging trolley during further lifting of said catches, until said charging trolley reaches said working position;

wherein each baking unit is configured for loading said charging rack into said cooking chamber or for unloading said charging rack therefrom, when said charging trolley is within said working position.

Since the catches are moved vertically upwards, these come into engagement with the assigned receptacles at the charging trolley, and during further lifting effect an alignment of the charging trolley, until the latter finally reaches a defined final position within the working position. Bottom unevennesses and differences in height of the charging trolley are irrelevant, since the charging trolley is lifted into the working position.

In this way a reproducible, precise positioning of the charging trolley is ensured within the working position.

In a further configuration of the invention at least one of the receptacles comprises a protrusion, preferably being configured as a pin-shaped element which can be centered with an assigned catch.

As a consequence of the protrusion which can be centered with a catch, a very simple centering design can be reached.

Preferably herein the protrusion is configured in a pin-shaped design which allows for a centering, even when being in a very unprecise positioning.

According to a further configuration of the invention one of the receptacles at the charging trolley comprises a guiding rod extending in transverse direction, which can be centered with a catch provided at the heat treatment device.

In a further development of this design at the heat treatment device there are provided two centering catches which can be aligned by the guiding rod and by means of which the charging trolley can be lifted into the working position.

In this way a particularly simple and precise alignment of the charging trolley is made possible in the vertical direction.

According to a further configuration of the invention at the charging trolley there is provided a bolt extending in vertical direction to which at the heat treatment device there are assigned two centering catches.

In this way an alignment and a shifting in vertical direction is made possible.

Preferably herein the centering catches are configured in prismatic shape.

Although basically also a different design is possible, for instance in the shape of a segment of a circle, however with prismatic-shaped catches a particularly simple and precise centering can be reached.

According to a further configuration of the invention at the heat treatment device there are provided two centering cranks for centering the charging trolley during driving against the heat treatment device.

Thereby the alignment of the charging trolley during driving against the heat treatment device is supported.

According to a further configuration of the invention the catches within the upper region and within the lower region of the heat treatment device can each be displaced by means of an individual drive for centering the assign receptacles at the charging trolley, wherein the drives are synchronized by means of a control.

In this way simple drives can be used for a precise positioning of the charging trolley.

According to a further configuration of the invention at the heat treatment device there is provided a sensor unit including at least one sensor for detecting the charging trolley within the charging position.

In this way it can be ensured that an (automatic) positioning of the charging trolley and a transfer into its working position is initiated only, when a charging trolley is within the charging position.

In addition at the heat treatment device there is provided preferably a further sensor by means of which the vertical position of the charging trolley at the heat treatment device is monitored, to ensure a defined final position within the working position. This is preferably coupled with a switching-off of the assigned drive, to provide in this way the defined final position within the vertical direction.

In this way a precise guidance and a precise positioning is ensured.

According to a further configuration of the invention the at least one sensor is configured as a proximity sensor, in particular an optical, a capacitive or an inductive proximity sensor.

In a feasible way the sensor allows a displacement of the catches only, if a charging trolley is detected at the heat treatment device.

According to a further configuration of the invention to the at least one charging rack there is assigned a handling device that allows for an automatic transfer between the charging rack and the assigned oven unit.

The handling device herein in particular may be configured according to WO 2013/124235 A2 mentioned at the outset which is fully incorporated by reference herewith.

It will be understood that the afore-mentioned features of the invention and the features to be mentioned hereinafter cannot only be used in the respectively given combination, but also in different combinations or independently, without leaving the scope of the invention.

BRIEF DESCRIPTION OF THE DRAWINGS

Further features and advantages of the invention can be taken from the subsequent description of preferred embodiments with reference to the drawings. In the drawings show.

DESCRIPTION OF PREFERRED EMBODIMENTS

Figure 1:
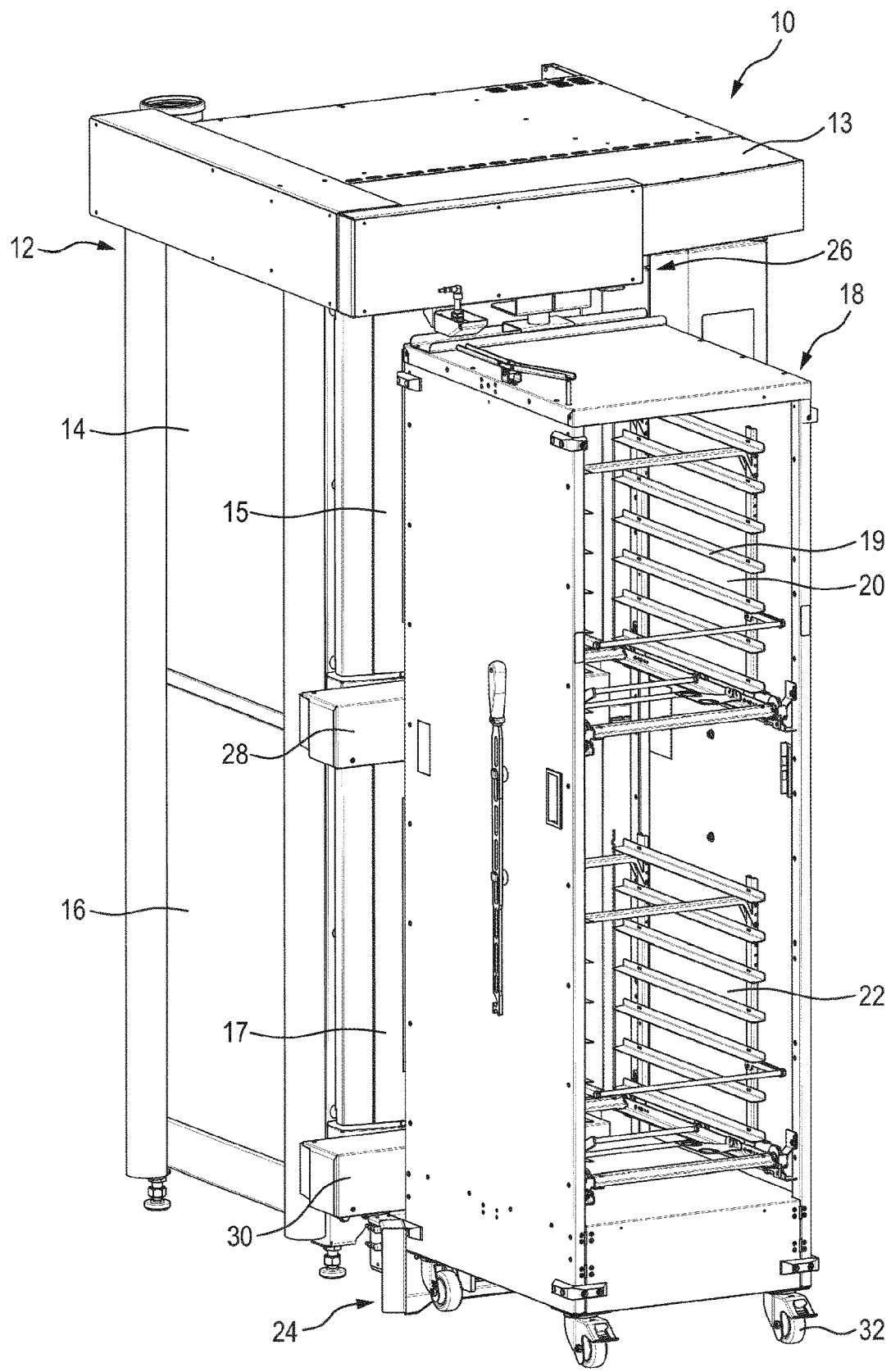
FIG. 1 a schematic representation of a device according to the invention for the heat treatment of food products.

FIG. 1 shows a device for the heat treatment of food products being designated in total with numeral 10, shown in perspective representation.

The device 10 comprises a heat treatment device 12 comprising two oven units 14, 16 which are arranged vertically above each other and which each comprise a cooking chamber 15, 17. The upper closure is formed by a common fume hood 13.

For charging and discharging the oven units 14, 16 there is provided a charging trolley 18 that can be displaced by means of rolls 32, and within which a charging rack 20, and 22, respectively, is arranged one vertically above the other, and within which product carriers 19 for receiving food products, such as bread rolls, are received.

If the charging trolley 18 is coupled in a suitable way to the heat treatment device 12, then the charging racks 20 and 22, respectively, can be automatically transferred to the respectively assigned oven unit 14 and 16, respectively, or can be removed therefrom after the completion of the baking operation.

The heat treatment device 12 comprises two coupling devices 24, 26 that serve for a coupling of the charging trolley 18 and for the lifting into a precise working position.

The charging racks 20, 22 are basically known, as for instance according to WO 2013/124235 A2 and can be displaced by means of rolls. The charging racks 20, 22 can be transferred using a handling device (depicted in FIG. 1 only in total with numerals 28 and 30) between the charging trolley 18 and the respectively assigned baking units 14, 16. To ensure a smooth transition between the charging trolley 18 and the respectively assigned baking unit 14, 16, or vice versa, it is necessary that the charging trolley 18 is within a working position so that the charging racks 20, 22 can be displaced without any problems between the charging trolley 18 and the assigned oven units 14, 16, or vice versa. In the working position the product carrier rails 19 of the charging racks 20, 22 are aligned horizontally and vertically with assigned product carrier rails (not shown) provided within the baking units 14, 16.

If the charging trolley 18 is coupled to the coupling devices 24, 26 in a suitable way so that the charging trolley 18 is within the working position for transferring the charging racks 20, 22 between the charging trolley 18 and the assigned baking units 14, 16, then by a locking device an automatic release of the charging racks 20, 22 is effected.

The coupling devices 24, 26 make it possible to transfer the charging trolley 18 from a charging position at the heat treatment device 12, which is only manually piloted, into the working position (and vice versa).

Figure 2:
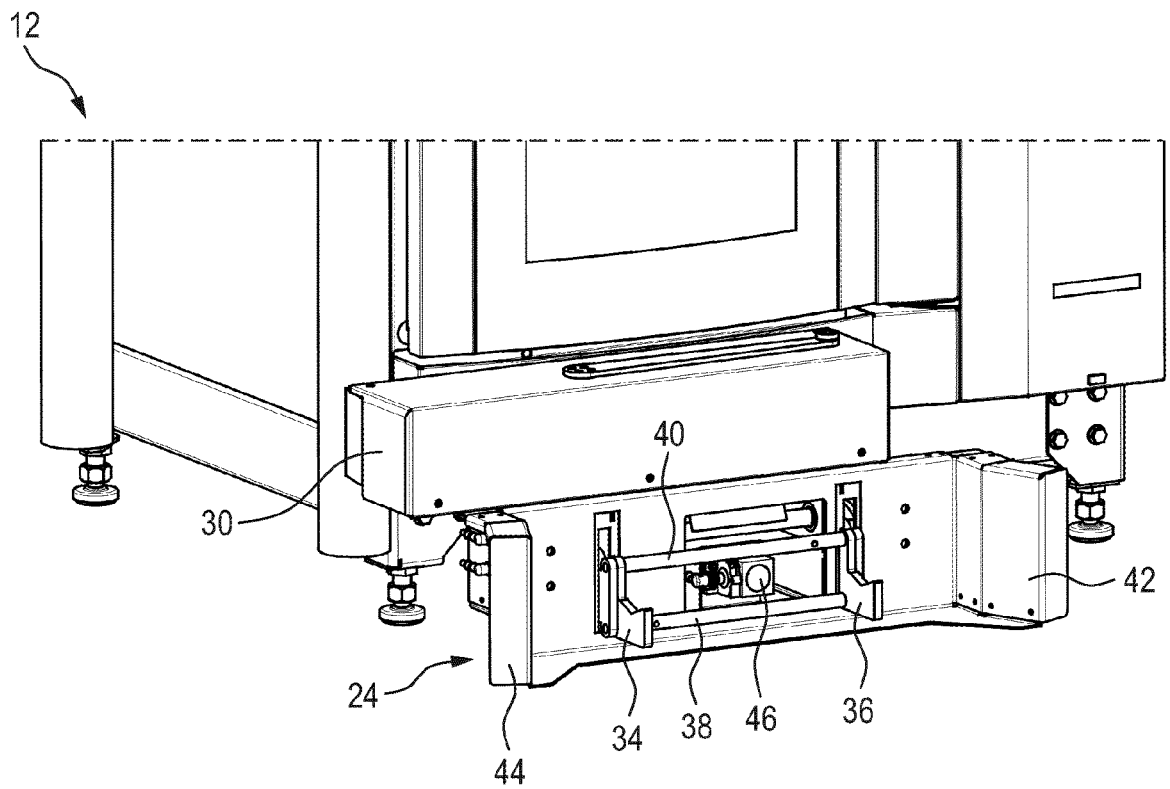
FIG. 2 an enlarged perspective partial representation of the heat treatment device at its bottom side against which the charging trolley can be driven.

To this end the charging trolley 18 initially is brought into a charging position at the coupling devices 24, 26. Herein two run-in cranks 42, 44 arranged laterally protruding to the outside in a slanted way are provided for a first centering of the charging trolley 18 (see FIG. 2).

Figure 3:
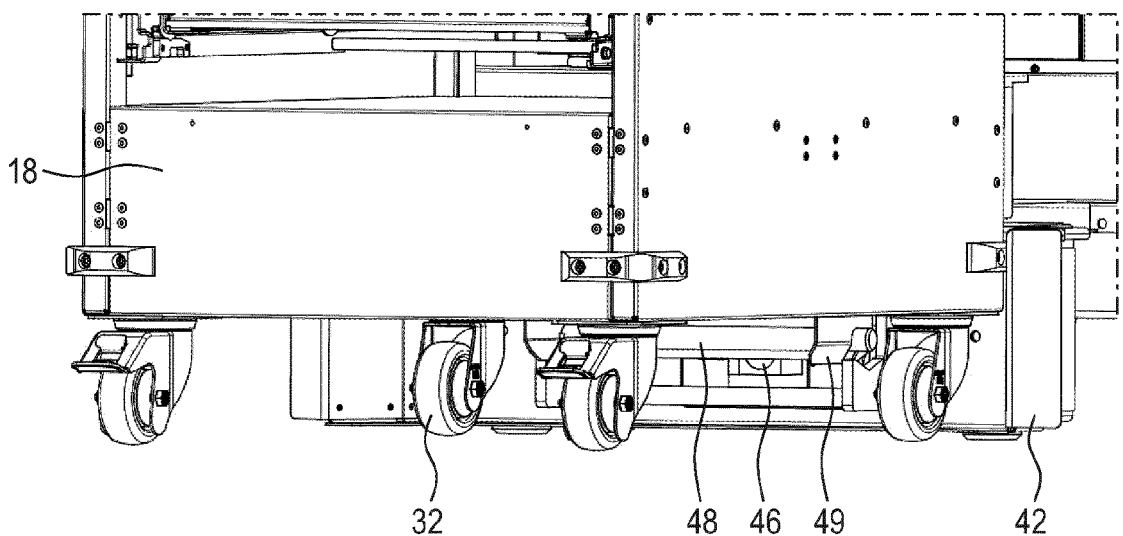
FIG. 3 a representation according to FIG. 2, wherein in addition an approached charging trolley can be seen.

The lower coupling device 24 at the heat treatment device 12 comprises two prismatic-shaped catches 34, 36 which are connected with each other by means of two transverse rods 38, 40. The catches 34, 36 cooperate with an assigned guiding rod 48 arranged in transverse direction at the lower end of the charging trolley 18 (see FIG. 3), to allow a centering of the charging trolley 18. In addition at the outer ends of the guiding rod 48 a guiding nose 49, each protruding downwardly in a slanted way (only the right one can be seen in FIG. 3), that cooperates with the lower transverse rod 38 at the coupling device 24.

At the upper end of the charging trolley 18 there is provided the upper coupling device 26, by means of which an alignment of the charging trolley 18 is reached at the upper end thereof.

To this end a vertical bolt 50 is provided at the charging trolley and is arranged in a centered way protruding upwardly. The two prismatic-shaped catches 52, 54 are assigned to the bolt 50 and can be displaced from the outside against the bolt 50. Together with the catches 52, 54 a centering of the charging trolley 18 the transverse direction is ensured.

Figure 4:
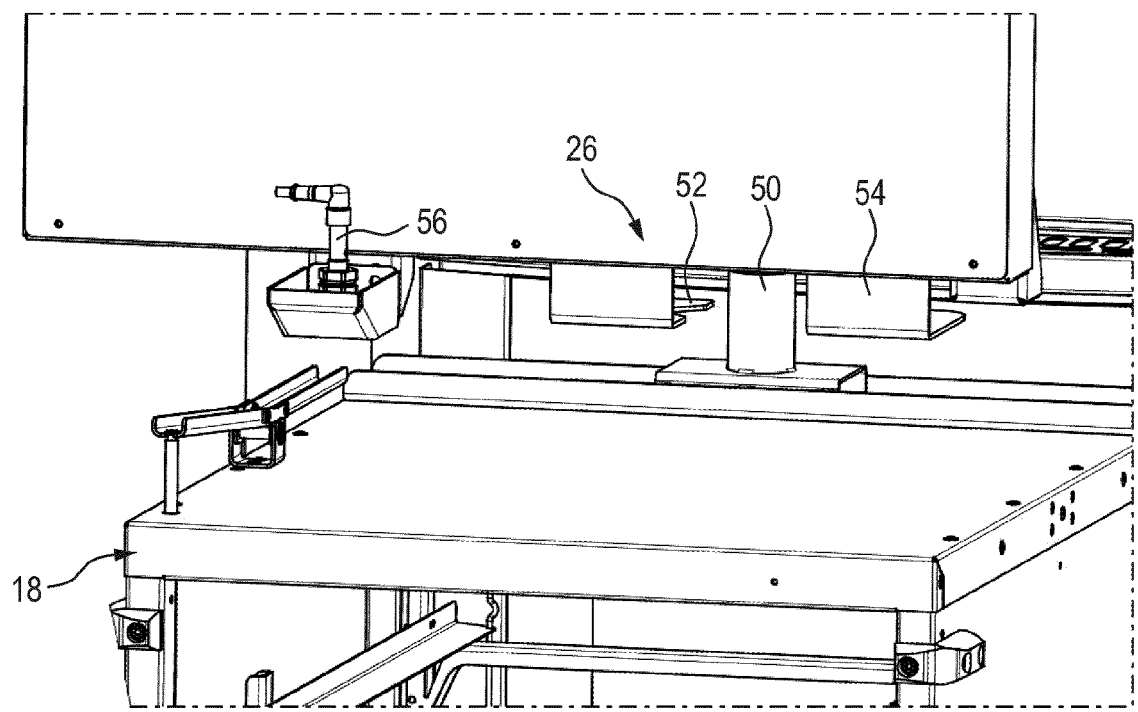
FIG. 4 an enlarged partial representation of the upper end of a charging trolley together with the assigned part of the heat treatment device.

In addition at the heat treatment device 12 there is provided a proximity sensor 56 (see FIG. 4) by means of which it can be detected whether the charging trolley 18 after lifting by means of the prisms 34, 36 has reached its working position in vertical direction.

For coupling the charging trolley 18 it is initially driven against the heat treatment device 12, until the guiding rod 48 engages with the prismatic-shaped catches 34, 36. This is detected by means of a proximity sensor 46 provided at the lower coupling device 24.

Thereafter the prismatic-shaped catches 52, 54 are run-up so that the charging trolley 18 at its upper end is aligned by means of the bolt 50.

Now the prismatic-shaped catches 34, 36 are lifted upwardly, until the charging trolley 18 reaches its working position which is detected by means of the sensor 56. The bolt 50 in combination with the prismatic-shaped catches 52, 54 herein allows a displacement in vertical direction, until the sensor 56 activates and the drive is automatically switched off.

If the charging trolley 18 has reached its defined final position within the working position, now a transfer of the charging racks 20, 22 between the charging trolley 18 and the assigned oven units 14, 16 can be performed by means of the handling devices 28, 30 at the heat treatment device 12, which may be configured in a known way, see WO 2013/124235 A2.

If the product carriers 19 after the completion of a baking process shall be removed from the oven units 14, 16, then the charging racks 20, 22 by means of the handling devices are moved into the charging trolley 18 until the final position. Then the charging trolley 18 again can be vertically displaced, whereby the locking device again locks the charging racks 20, 22 by means of assigned gravity catches, and finally the charging trolley 18 rests again on the bottom by means of its rolls 32.

Only in this case the program for lifting the charging trolley 18 into the working position, or for lowering the charging trolley 18 from the working position into the charging position, respectively, can be initiated.

The complete device preferably can be operated by means of a central programmed control. This means that only a charging trolley 18 must be run into the charging position, and that thereafter after detecting by means of the proximity sensor 46, the coupling devices 24, 26 can be started program-controlled, for displacing the charging trolley 48 into the working position. If the charging racks 20, 22 are displaced into the baking units 14, 16 so that these are loaded, then the desired heat treatment cycle can be performed program-controlled.

After the completion of the heat treatment process the charging racks 20, 22 again can be displaced into the charging trolley 18 using the assigned handling devices 28, 30, and then the program for lowering the charging trolley 18 into the charging position can be started.

The invention claimed is:

1. A device for the heat treatment of food products, comprising:
   a heat treatment device having at least one baking unit including a cooking chamber being configured for receiving product carriers with food products;
   a charging trolley being configured for receiving at least one charging rack being configured for carrying a plurality of product carriers;
   a positioning device arranged at said heat treatment device and comprising a first coupling device at a lower end of said heat treatment device and a second coupling device at an upper end of said heat treatment device;
   said first coupling device comprising a plurality of catches provided on said positioning device and further comprising a plurality of receptacles provided on said charging trolley and being configured for engaging said catches when moving said charging trolley against said positioning device into a charging position;
   said second coupling device comprising at least one catch and at least one receptacle cooperating with each other for engaging said charging trolley when said charging trolley is moved into said charging position;
   wherein at least one of said catches of the first coupling device or the catch of the second coupling device vertically aligns said charging trolley by lifting said charging trolley from said charging position into said working position, wherein each charging rack is horizontally and vertically aligned with an assigned cooking chamber; and
   wherein each baking unit comprises a handling device being configured for loading said charging rack into said cooking chamber or for unloading said charging rack therefrom, when said charging trolley is within said working position.

2. The device of claim 1, wherein at least one of said receptacles comprises a protrusion, which is configured for centering with an assigned catch.

3. The device of claim 2, wherein said protrusion is configured in the shape of a rod-shaped element.

4. The device of claim 1, wherein said at least one receptacle of said second coupling device comprises a guiding rod being configured for centering with an assigned catch located at said heat treatment device.

5. The device of claim 4, wherein at said heat treatment device there are provided two centering catches along which said guiding rod can be aligned, and by means of which said charging trolley can be lifted into said working position.

6. The device of claim 1, wherein said charging trolley comprises a receptacle being configured as a bolt extending in vertical direction and cooperating with two centering catches provided at said heat treatment device.

7. The device of claim 5, wherein said centering catches are configured in prismatic shape.

8. The device of claim 1, wherein said first coupling device at said heat treatment device comprises two catches being configured as centering cranks for centering said charging trolley in a horizontal direction when running against said heat treatment device.

9. The device of claim 8, wherein said heat treatment device comprises at least two upper catches of said second coupling device and at least two lower catches of said first coupling device for centering said charging trolley at an upper end and at a lower end thereof.

10. The device of claim 8, wherein each catch is configured to be displaced individually, and wherein said catches can be driven in a synchronized way.

11. The device of claim 1, further comprising a sensor for detecting, whether said charging trolley is within said charging position.

12. The device of claim 1, further comprising a sensor for detecting, whether said charging trolley is within said working position.

13. The device of claim 12, wherein said sensor is configured as a proximity sensor.

14. The device of claim 12, wherein said sensor provides an output signal allowing a displacement of said catches only if a charging trolley is detected within the charging position.

15. The device of claim 1, wherein said handling device is configured for effecting an automatic transfer between said charging rack and said assigned baking unit.

16. The device of claim 12, wherein said sensor is configured as a proximity sensor.

17. A device for h heat treats food products, comprising:
a heat treatment device having at least one baking unit including a cooking chamber being configured for receiving product carriers with food products;
a charging trolley being configured for receiving at least one charging rack for a plurality of product carriers,
a positioning device arranged at said heat treatment device and being configured for engaging said charging trolley when said charging trolley is moved against said positioning device into a charging position and for moving said charging trolley between said charging position and a working position, wherein each charging rack is aligned with an assigned cooking chamber;
a plurality of catches provided on said positioning device;
a plurality of receptacles provided on said charging trolley and being configured for engaging said catches when moving said charging trolley against said positioning device; and
wherein said positioning device is further configured for moving said charging trolley with said catches vertically from said charging position into said working position;
wherein each baking unit is configured for loading said charging rack into said cooking chamber or for unloading said charging rack therefrom when said charging trolley is within said working position.

18. The device of claim 17, further comprising a sensor for detecting, whether said charging trolley is within said charging position.

19. The device of claim 17, further comprising a sensor for detecting, whether said charging trolley is within said working position.

20. The device of claim 17, wherein said heat treatment device co se at least two upper catches and at least two lower catches for centering said charging trolley at an upper end and at a lower end thereof.

* * * * *